(12) United States Patent
Sather et al.

(10) Patent No.: US 10,373,149 B1
(45) Date of Patent: Aug. 6, 2019

(54) SECURE DATA ENTRY USING A CARD READER WITH MINIMAL DISPLAY AND INPUT CAPABILITIES HAVING A DISPLAY

(71) Applicant: Square, Inc., San Francisco, CA (US)

(72) Inventors: Elliot Sather, San Francisco, CA (US); Robert von Behren, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 1348 days.

(21) Appl. No.: 13/713,985

(22) Filed: Dec. 13, 2012

Related U.S. Application Data

(60) Provisional application No. 61/725,409, filed on Nov. 12, 2012.

(51) Int. Cl.
*G06Q 20/32* (2012.01)
*G06Q 20/34* (2012.01)
*G06Q 20/40* (2012.01)

(52) U.S. Cl.
CPC ......... *G06Q 20/3223* (2013.01); *G06Q 20/34* (2013.01); *G06Q 20/409* (2013.01)

(58) Field of Classification Search
CPC combination set(s) only.
See application file for complete search history.

(56) References Cited

U.S. PATENT DOCUMENTS

| | | | |
|---|---|---|---|
| 5,832,206 A | 11/1998 | De Jesus et al. | |
| 5,940,511 A * | 8/1999 | Wilfong | G06Q 20/4012 705/72 |
| 6,257,486 B1 * | 7/2001 | Teicher | G06K 7/0021 235/380 |
| 6,313,838 B1 | 11/2001 | Deering | |
| 6,373,499 B1 | 4/2002 | Acker | |
| 6,543,684 B1 | 4/2003 | White et al. | |
| 6,669,100 B1 | 12/2003 | Rogers et al. | |
| 6,771,877 B1 | 8/2004 | Ono et al. | |

(Continued)

FOREIGN PATENT DOCUMENTS

| | | |
|---|---|---|
| AU | 2011275691 B2 | 8/2014 |
| AU | 2018203297 A1 | 5/2018 |

(Continued)

OTHER PUBLICATIONS

Alzubaidi, A., and Kalita, J., "Authentication of Smartphone Users Using Behavioral Biometrics," IEEE Communications Surveys & Tutorials, vol. 18, Issue 3, pp. 1-32 (Mar. 2, 2016).

Cai, L., and Chen, H., "On the Practicality of Motion Based Keystroke Inference Attack," Lecture Notes in Computer Science, Trust 2012: Trust and Trustworthy Computing, vol. 7344, pp. 273-290 (2012).

(Continued)

*Primary Examiner* — Steven S Kim
*Assistant Examiner* — Johann Y Choo
(74) *Attorney, Agent, or Firm* — Maynard Cooper & Gale, LLP; Chitra M. Kalyanaraman, Esq.

(57) ABSTRACT

A card reader comprising a display configured to optionally graphically display a character; one or more sensors configured to receive user input, wherein the one or more sensors are configured to send one or more signals that modify and select the character; a microcontroller configured to process the user input, wherein the processing comprises modifying or selecting the character based on user input at the one or more sensors; and memory configured to store selected characters based on processing the user input.

22 Claims, 8 Drawing Sheets

(56) References Cited

U.S. PATENT DOCUMENTS

| | | | |
|---|---|---|---|
| 6,836,313 B2 * | 12/2004 | Ishizaki | G02B 5/3083 |
| | | | 349/115 |
| 7,484,173 B2 | 1/2009 | Gao et al. | |
| 8,231,055 B2 * | 7/2012 | Wen | G06Q 20/32 |
| | | | 235/449 |
| 8,392,935 B2 | 3/2013 | Grabowski | |
| 8,500,018 B2 * | 8/2013 | McKelvey | G06Q 20/10 |
| | | | 235/379 |
| 8,632,002 B2 * | 1/2014 | Boutcher | G06Q 20/341 |
| | | | 235/379 |
| 8,711,116 B2 | 4/2014 | Papakipos et al. | |
| 8,850,216 B1 | 9/2014 | Mikhailov et al. | |
| 8,914,884 B1 | 12/2014 | Kogan et al. | |
| 9,230,254 B1 * | 1/2016 | Sharifi Mehr | G06Q 20/3567 |
| 9,346,282 B2 | 5/2016 | Page et al. | |
| 9,430,635 B2 | 8/2016 | Dai Zovi | |
| 9,483,653 B2 | 11/2016 | Dai Zovi | |
| 9,489,354 B1 | 11/2016 | Lee et al. | |
| 9,556,491 B2 | 1/2017 | Hoon | |
| 9,613,353 B1 | 4/2017 | Quigley | |
| 9,613,356 B2 | 4/2017 | Edwards | |
| 9,619,802 B1 | 4/2017 | Dai Zovi et al. | |
| 9,632,614 B2 | 4/2017 | Howard et al. | |
| 9,858,432 B2 | 1/2018 | Dai Zovi | |
| 9,926,501 B2 | 3/2018 | Yows et al. | |
| 9,965,654 B2 | 5/2018 | Dai Zovi | |
| 10,037,518 B2 | 7/2018 | Dai Zovi et al. | |
| 2003/0014372 A1 * | 1/2003 | Wheeler | G06F 21/32 |
| | | | 705/71 |
| 2003/0182558 A1 | 9/2003 | Lazzaro et al. | |
| 2003/0235452 A1 | 12/2003 | Kraus et al. | |
| 2004/0057600 A1 | 3/2004 | Niwa | |
| 2004/0151385 A1 | 8/2004 | Oneda et al. | |
| 2004/0257238 A1 | 12/2004 | De Jongh | |
| 2004/0268148 A1 * | 12/2004 | Karjala | H04L 41/0806 |
| | | | 726/15 |
| 2005/0074117 A1 | 4/2005 | Tanaka et al. | |
| 2005/0114395 A1 | 5/2005 | Muralidharan | |
| 2005/0213766 A1 | 9/2005 | Goss | |
| 2005/0228724 A1 | 10/2005 | Frangiosa | |
| 2006/0202797 A1 * | 9/2006 | Theis | B60R 25/243 |
| | | | 340/5.52 |
| 2006/0224523 A1 | 10/2006 | Elvitigala | |
| 2006/0242421 A1 | 10/2006 | Hsu | |
| 2007/0016792 A1 | 1/2007 | Allen, Jr. et al. | |
| 2007/0051808 A1 * | 3/2007 | Adams | G06K 17/0022 |
| | | | 235/451 |
| 2007/0058843 A1 * | 3/2007 | Theis | G06K 9/00006 |
| | | | 382/124 |
| 2007/0154018 A1 | 7/2007 | Watanabe | |
| 2007/0183000 A1 | 8/2007 | Eisen et al. | |
| 2008/0008314 A1 | 1/2008 | Dempski et al. | |
| 2008/0060052 A1 | 3/2008 | Hwang et al. | |
| 2008/0110981 A1 | 5/2008 | DeLine et al. | |
| 2008/0148186 A1 | 6/2008 | Krishnamurthy | |
| 2008/0168546 A1 | 7/2008 | Almeida | |
| 2008/0192047 A1 | 8/2008 | Radzikowski et al. | |
| 2008/0209212 A1 | 8/2008 | Ditzman et al. | |
| 2008/0258940 A1 | 10/2008 | Ding et al. | |
| 2008/0283590 A1 | 11/2008 | Oder, II et al. | |
| 2008/0301767 A1 | 12/2008 | Picard et al. | |
| 2009/0044282 A1 | 2/2009 | Govindaraju | |
| 2009/0060334 A1 | 3/2009 | Rayner | |
| 2009/0254994 A1 | 10/2009 | Waterson | |
| 2010/0109920 A1 | 5/2010 | Spradling | |
| 2010/0134248 A1 * | 6/2010 | Adams | G06F 21/35 |
| | | | 340/5.83 |
| 2010/0134328 A1 | 6/2010 | Gutowitz et al. | |
| 2010/0134624 A1 | 6/2010 | Bobbitt et al. | |
| 2010/0153270 A1 * | 6/2010 | Hawkes | G06F 21/36 |
| | | | 705/44 |
| 2010/0180120 A1 | 7/2010 | Frenkel et al. | |
| 2010/0259560 A1 | 10/2010 | Jakobson et al. | |
| 2010/0262835 A1 | 10/2010 | Joffray | |
| 2011/0042455 A1 * | 2/2011 | Lu | G06F 21/34 |
| | | | 235/380 |
| 2011/0064383 A1 | 3/2011 | Bauchot et al. | |
| 2011/0185319 A1 | 7/2011 | Carapelli | |
| 2011/0189981 A1 | 8/2011 | Faith et al. | |
| 2011/0225406 A1 | 9/2011 | Nelson et al. | |
| 2012/0042364 A1 | 2/2012 | Hebert | |
| 2012/0089519 A1 | 4/2012 | Peddada | |
| 2012/0104090 A1 | 5/2012 | Gross | |
| 2012/0249408 A1 | 10/2012 | Moliton | |
| 2012/0268393 A1 | 10/2012 | Lee | |
| 2012/0299831 A1 | 11/2012 | Lioy | |
| 2012/0308075 A1 | 12/2012 | Takenaka et al. | |
| 2012/0317628 A1 | 12/2012 | Yeager | |
| 2012/0323788 A1 | 12/2012 | Keresman, III et al. | |
| 2013/0033523 A1 | 2/2013 | Stovicek et al. | |
| 2013/0050091 A1 | 2/2013 | Ge et al. | |
| 2013/0067228 A1 | 3/2013 | Dewan et al. | |
| 2013/0086389 A1 | 4/2013 | Suwald | |
| 2013/0091583 A1 | 4/2013 | Karroumi et al. | |
| 2013/0100182 A1 | 4/2013 | Yeh et al. | |
| 2013/0127857 A1 | 5/2013 | Carr et al. | |
| 2013/0139248 A1 | 5/2013 | Rhee et al. | |
| 2013/0144792 A1 | 6/2013 | Nilsson et al. | |
| 2013/0145475 A1 | 6/2013 | Ryu et al. | |
| 2013/0159196 A1 | 6/2013 | DiZoglio | |
| 2013/0162679 A1 | 6/2013 | Kim et al. | |
| 2013/0194301 A1 | 8/2013 | Robbins et al. | |
| 2013/0205387 A1 | 8/2013 | Le et al. | |
| 2013/0207902 A1 | 8/2013 | Showering | |
| 2013/0276019 A1 | 10/2013 | Liu | |
| 2013/0282569 A1 | 10/2013 | Kang | |
| 2013/0301830 A1 | 11/2013 | Bar-El et al. | |
| 2013/0320080 A1 | 12/2013 | Olson et al. | |
| 2013/0333011 A1 * | 12/2013 | Quigley | G06Q 20/3674 |
| | | | 726/7 |
| 2014/0025579 A1 * | 1/2014 | Nilsson | G06F 21/35 |
| | | | 705/44 |
| 2014/0028566 A1 | 1/2014 | Gupta | |
| 2014/0040633 A1 | 2/2014 | Leleu | |
| 2014/0095387 A1 | 4/2014 | Colnot | |
| 2014/0096201 A1 | 4/2014 | Gupta | |
| 2014/0100973 A1 | 4/2014 | Brown et al. | |
| 2014/0129445 A1 | 5/2014 | Yang | |
| 2014/0149749 A1 | 5/2014 | Wang | |
| 2014/0188734 A1 | 7/2014 | Neuwirth | |
| 2014/0191994 A1 | 7/2014 | Chung | |
| 2014/0194061 A1 | 7/2014 | Fine | |
| 2014/0196158 A1 | 7/2014 | Buck | |
| 2014/0201831 A1 | 7/2014 | Yi et al. | |
| 2014/0229744 A1 | 8/2014 | Doumen | |
| 2014/0282204 A1 | 9/2014 | Park et al. | |
| 2014/0289130 A1 | 9/2014 | Savolainen et al. | |
| 2014/0324708 A1 | 10/2014 | McCauley et al. | |
| 2014/0327630 A1 | 11/2014 | Burr et al. | |
| 2014/0351739 A1 | 11/2014 | Leger | |
| 2014/0380452 A1 | 12/2014 | Suwald | |
| 2015/0006405 A1 | 1/2015 | Palmer et al. | |
| 2015/0007265 A1 | 1/2015 | Aissi et al. | |
| 2015/0039883 A1 | 2/2015 | Yoon et al. | |
| 2015/0073983 A1 | 3/2015 | Bartenstein et al. | |
| 2015/0095241 A1 | 4/2015 | Edwards | |
| 2015/0137944 A1 | 5/2015 | Fuerth | |
| 2015/0154414 A1 | 6/2015 | Pike | |
| 2015/0186857 A1 | 7/2015 | Swinfen | |
| 2015/0199527 A1 | 7/2015 | Picon | |
| 2015/0234757 A1 | 8/2015 | You et al. | |
| 2015/0243258 A1 | 8/2015 | Howe | |
| 2015/0253925 A1 | 9/2015 | Nakao et al. | |
| 2015/0261968 A1 | 9/2015 | Polyachenko | |
| 2015/0287009 A1 | 10/2015 | Crowley et al. | |
| 2015/0371213 A1 | 12/2015 | Pike | |
| 2016/0050069 A1 | 2/2016 | Griffin et al. | |
| 2016/0110714 A1 | 4/2016 | Norland | |

(56) References Cited

U.S. PATENT DOCUMENTS

| | | | |
|---|---|---|---|
| 2016/0142202 A1 | 5/2016 | Dai Zovi | |
| 2016/0155111 A1 | 6/2016 | Arnald et al. | |

FOREIGN PATENT DOCUMENTS

| | | |
|---|---|---|
| CA | 2 925 747 A1 | 4/2015 |
| JP | 5172240 B2 | 3/2013 |
| JP | 2013-101649 A | 5/2013 |
| WO | 2006/000021 A1 | 1/2006 |
| WO | 2013/040684 A1 | 3/2013 |
| WO | 2015/048040 A1 | 4/2015 |
| WO | 2015/048041 A1 | 4/2015 |
| WO | 2016/069782 A1 | 5/2016 |
| WO | 2016/122749 A2 | 8/2016 |
| WO | 2017/100135 A1 | 6/2017 |

OTHER PUBLICATIONS

Cai, L., and Chen, H., "TouchLogger: Inferring Keystrokes on Touch Screen From Smartphone Motion," In: Proceedings of the 6th USENIX Conference on Hot Topics in Security, HotSec 2011, pp. 1-6.

Jacomet, M., et al., "On Using Fingerprint-Sensors for Pin-Pad Entry," 4th IEEE International Symposium on Electronic Design, Test and Applications (delta 2008), Hong Kong, pp. 1-6 (Jan. 23-25, 2008).

Lenovo, et al., "Automatic entry of dynamic password data," The IP.com Journal, The IP.com Prior Art Database, published Dec. 8, 2010, pp. 1-2.

Ling, C., et al., "You Cannot Sense My PINs: A Side-Channel Attack Deterrent Solution Based on Haptic Feedback on Touch-Enabled Devices," 2016 IEEE Global Communications Conference (GLOBECOM), Washington, DC, pp. 1-7 (Dec. 4-8, 2016).

"Method of Self-Adapted Tactile Sensitive Passcode Management," The IP.com Journal, The IP.com Prior Art Database, published Oct. 11, 2016.

O'Gorman, L., "Comparing passwords, tokens, and biometrics for user authentication," Proceedings of the IEEE, vol. 91, Issue 12, pp. 1-38 (Dec. 2003).

"Passcode-Lock Mechanisms with Design Codes," The IP.com Journal, The IP.com Prior Art Database, published May 9, 2008.

Rilvan, M. A., et al., "User authentication and identification on smartphones by incorporating capacitive touchscreen," 2016 IEEE 35th International Performance Computing and Communications Conference (IPCCC), Las Vegas, NV, pp. 1-8 (Dec. 9-11, 2016).

"Securing pass code entry by hiding code presentation," The IP.com Journal, The IP.com Prior Art Database, published Oct. 21, 2009.

Shen, C., et al., "Performance Analysis of Multi-Motion Sensor Behavior for Active Smartphone Authentication," IEEE Transactions on Information Forensics and Security, vol. 13, Issue 1, pp. 48-62 (Aug. 9, 2017).

"Technical Brief NVIDIA GeForce 8800 GPU Architecture Overview World's First Unified DirectX 10 GPU Delivering Unparalleled Performance and Image Quality," NVIDIA Corporation, published Nov. 1, 2006, Retrieved from Internet URL: http://web.cse.ohio-state.edu/~agrawal.28/788-su08/Papers/week2/GPU.pdf, on Oct. 6, 2017, pp. 17-20.

Teh, P., et al., "NFC smartphone based access control system using information hiding," 2013 IEEE Conference on Open Systems (ICOS), Kuching, pp. 13-17 (Dec. 2-4, 2013).

Yang, J., and Goodman, J., "Symmetric Key Cryptography on Modern Graphics Hardware," Advances in Cryptology, ASIACRYPT 2007, LNCS vol. 4833, pp. 249-264.

Zheng, M., et al., "You Are How You Touch: User Verification on Smartphones via Tapping Behaviors," 2014 IEEE 22nd International Conference on Network Protocols, Raleigh, NC, pp. 1-12 (Oct. 21-24, 2014).

Non-Final Office Action dated Feb. 1, 2016, for U.S. Appl. No. 14/527,639, of Zovi, D.D., filed Oct. 29, 2014.
Notice of Allowance dated Apr. 27, 2016, for U.S. Appl. No. 14/527,639, of Zovi, D.D., filed Oct. 29, 2014.
Non-Final Office Action dated May 6, 2016, for U.S. Appl. No. 14/527,629, of Zovi, D.D., filed Oct. 29, 2014.
Non-Final Office Action dated May 19, 2016, for U.S. Appl. No. 14/542,481, of Zovi, D.D., filed Nov. 14, 2014.
Non-Final Office Action dated May 19, 2016, for U.S. Appl. No. 14/140,790, of Quigley, O.S.C., filed Dec. 26, 2013.
Notice of Allowance dated Jul. 11, 2016, for U.S. Appl. No. 14/527,629, of Zovi, D.D., filed Oct. 29, 2014.
Non-Final Office Action dated Aug. 26, 2016, for U.S. Appl. No. 14/964,430, of Zovi, D.D., et al., filed Dec. 9, 2015.
Final Office Action dated Nov. 18, 2016, for U.S. Appl. No. 14/542,481, of Zovi, D.D., filed Nov. 14, 2014.
Notice of Allowance dated Nov. 18, 2016, for U.S. Appl. No. 14/140,790, of Quigley, O.S.C., filed Dec. 26, 2013.
Notice of Allowance dated Dec. 6, 2016, for U.S. Appl. No. 14/964,430, of Zovi, D.D., et al., filed Dec. 9, 2015.
Non Final Office Action dated Feb. 10, 2017, for U.S. Appl. No. 15/252,113, of Zovi, D.D., filed Aug. 30, 2016.
Non Final Office Action dated Mar. 31, 2017, for U.S. Appl. No. 15/196,003, of Zovi, D.D., filed Jun. 28, 2016.
Non-Final Office Action dated Apr. 26, 2017, for U.S. Appl. No. 15/444,782, of Quigley, O.S.C., filed Feb. 28, 2017.
Examination Report No. 1 for Australian Patent Application No. 2015339271, dated May 12, 2017.
Final Office Action dated Jul. 28, 2017, for U.S. Appl. No. 15/252,113, of Zovi, D.D., filed Aug. 30, 2016.
Notice of Allowance dated Aug. 30, 2017, for U.S. Appl. No. 15/252,113, of Zovi, D.D., filed Aug. 30, 2016.
Final Office Action dated Sep. 12, 2017, for U.S. Appl. No. 15/444,782, of Quigley, O.S.C., filed Feb. 28, 2017.
Final Office Action dated Sep. 22, 2017, for U.S. Appl. No. 15/196,003, of Zovi, D.D., filed Jun. 28, 2016.
Non-Final Office Action dated Nov. 30, 2017, for U.S. Appl. No. 15/444,931, of Zovi, D.D., et al., filed Feb. 28, 2017.
Non-Final Office Action dated Dec. 20, 2017, for U.S. Appl. No. 15/474,761, of Wolter, J.A., et al., filed Mar. 30, 2017.
Notice of Allowance dated Jan. 4, 2018, for U.S. Appl. No. 15/196,003, of Zovi, D.D., filed Jun. 28, 2016.
Notice of Allowance dated Mar. 30, 2018, for U.S. Appl. No. 15/444,931, of Zovi, D.D., et al., filed Feb. 28, 2017.
Final Office Action dated Jun. 26, 2018, for U.S. Appl. No. 15/474,761, of Wolter, J.A., et al., filed Mar. 30, 2017.
First Examination Report for Australian Patent Application No. 2016367092, dated Jul. 25, 2018.
Non-Final Office Action dated Jul. 26, 2018, for U.S. Appl. No. 15/444,782, of Quigley, O.S.C., filed Feb. 28, 2017.
EIC 3600 Search Report dated Jul. 26, 2018, for U.S. Appl. No. 15/444,782, of Quigley, O.S.C., filed Feb. 28, 2017.
Advisory Action dated Sep. 21, 2018, for U.S. Appl. No. 15/474,761, of Wolter, J.A., et al., filed Mar. 30, 2017.
International Search Report and Written Opinion for International Application No. PCT/US2015/057876, dated Mar. 31, 2016.
International Search Report and Written Opinion for International Application No. PCT/US2015/060713, dated Jul. 26, 2016.
International Search Report and Written Opinion for International Application No. PCT/US2016/065003, dated Feb. 7, 2017.
Extended European Search Report for European Patent Application No. 15854476.7, dated Sep. 29, 2017.
Non-Final Office Action dated Nov. 2, 2018, for U.S. Appl. No. 15/474,761, of Wolter, J.A., et al., filed Mar. 30, 2017.
Notice of Allowance dated Nov. 28, 2018, for U.S. Appl. No. 15/444,782, of Quigley, O.S.C., filed Feb. 28, 2017.
Second Examination Report for Australian Patent Application No. 2016367092, dated Feb. 11, 2019.

\* cited by examiner

SECURE DATA ENTRY USING A CARD READER WITH MINIMAL DISPLAY AND INPUT CAPABILITIES HAVING A DISPLAY

CROSS-REFERENCE TO RELATED APPLICATIONS

This application claims the benefit under 35 U.S.C. § 119(e) and is the nonprovisional of U.S. Provisional Patent Application No. 61/725,409, entitled SECURE DATA ENTRY USING A CARD READER HAVING A DISPLAY, filed Nov. 12, 2012, which is incorporated herein by reference in its entirety.

TECHNICAL FIELD

This disclosure relates to card processing using mobile devices.

BACKGROUND

In a conventional point-of-sale electronic credit card transaction with a smart card (also called a "chip card" or "integrated circuit card"), a cardholder's identity is confirmed by requiring the entry of a Personal Identification Number (PIN) rather than or in addition to signing a paper receipt. A user provides a credit card at the point-of-sale to a merchant. The merchant processes the card using a card reader, e.g., the card is inserted into the reader to engage electrical contacts for the microchip. The user can enter the PIN on a keypad terminal of the reader, i.e., the keypad and the reader are a single physically integrated device. After the user enters the PIN, the PIN is either sent to a card issuer that determines whether the entered PIN is correct or incorrect, or verified by the chip.

The card transaction is further authorized and captured. In the authorization stage, if the entered PIN is correct, a payment request is sent electronically from the card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include a cardholder's signature, if appropriate. The capture state can trigger the financial transaction between the card issuer and the merchant, and optionally creates a receipt. There can also be other entities, e.g., the card acquirer, in the route of the transaction. Debit card transactions have a different routing, but also require insertion of the smart card into a reader.

Mobile card readers are available for magnetic stripe cards. Some mobile card readers use WiFi technology to communicate with the credit card processor via a wireless network access point. Some mobile card readers, e.g., in taxies, use cellular technology to communicate wirelessly with the credit card processor.

SUMMARY

Existing chip card readers are generally bulky and expensive. However, a card reader configured to read a smart card can be detachably connected to a mobile computing device, e.g., a smart phone, tablet computer, or the like. The mobile device can be a common consumer device, e.g., an iPhone or iPad. When the card reader is attached to the mobile device, e.g., plugged into the audio port, an application installed on the mobile computing device permits the mobile device to communicate with the card reader in order to process transactions.

Separating out PIN entry and the display can prevent PIN theft during software PIN entry of a payment transaction. If the PIN is either directly displayed on or entered into the mobile device, malware or other unauthorized software can take screenshots of a display of the mobile device or detect locations of user input during PIN entry. Generally, when a user inputs a PIN on the mobile device on a keypad interface, the mobile device provides user feedback, e.g., the mobile device highlights, on the keypad interface, a background of a cell that the user interfaced with. By moving the PIN display, the PIN entry or both from the mobile device to the reader, a mobile device infected with malware is unable to access the PIN. The PIN can be entered using one or more sensors on a card reader. The PIN can also be entered, using a non-keypad interface, on a touch display of the mobile computing device.

In one aspect, a method for processing payment transactions between a card, a card reader and a mobile device separate from the card reader, comprising: receiving, at the card reader, a request for a password from the card; determining a value for each character of the password through user input at the card reader comprising: displaying, on a graphical display included in the card reader, a character; receiving user input at one or more sensors of the card reader, wherein the card reader selects or modifies the character based on the user input; if the user input is a modification input: modifying the displayed character based on the modification input; displaying, on the graphical display, the modified character; if the user input is a selection input: sending a selection signal to the mobile device that is separate from the card reader, where the selection signal causes the mobile device to display an indication of the user input on a display of the mobile device; storing the selected character in the card reader; and repeating the determining until the password is submitted.

Implementations can include one or more of the following. Generating the password from the stored characters; submitting the password to the card for authorization; receiving an authentication from the card; and sending the authentication to the mobile device.

Generating the password from the stored characters; encrypting the password using a cryptographic key; sending the encrypted password to the mobile device. The indication of the input is a graphical symbol. The mobile device displays a number of empty spots equal to a preset length of the password, and where the mobile device displays the graphical symbol at an empty spot upon receiving each selection signal. The selection input or the modification input comprises a user tap of one or more sensors on the card reader. The character is a single-digit integer, wherein the modification input increments or decrements the character based on the user input at a first sensor or a second sensor included in the card reader, respectively, and wherein upon modifying the displayed character based on the modification input comprises: incrementing or decrementing the character based on the user tap of the first or the second sensor, respectively.

In another aspect, a card reader comprising: a display configured to graphically display a character; one or more sensors configured to receive user input, wherein the one or more sensors are configured to send one or more signals that modify and select the character; a microcontroller configured to process the user input, wherein the processing comprises modifying or selecting the character based on user input at the one or more sensors; and memory configured to store selected characters based on processing the user input.

Implementations can include one or more of the following. The character is an integer, and wherein the one or more sensors comprises a first sensor that selects the character, a second sensor that increments the character, and a third sensor that decrements the character. Circuitry that communicates to a mobile device through an audio jack. Circuitry that communicates to a mobile device wirelessly. The display is a segment display or an electrophoretic ink display. The one or more sensors includes a scroll wheel for selection of the character. A plurality of light emitting diodes, where a light emitting diode turns on for each selected character.

In another aspect, a method for processing payment transactions between a card, a card reader and a mobile device separate from the card reader, comprising: receiving, at the card reader, a request for a password from the card; determining a value for each character of the password through user input at the mobile device comprising: displaying, on a graphical display included in the card reader, a randomized character; receiving data representing user input from the mobile device, wherein the user input selects or modifies the character, and wherein the mobile device displays an indication of the input upon a selection input; if the user input is a modification input: modifying the displayed character based on the modification input; displaying, on the graphical display, the modified character; if the user input is a selection input: receiving a selection signal from the mobile device that is separate from the card reader; storing the selected character in the card reader; and repeating the determining until the password is submitted.

Implementations can include one or more of the following. Generating the password from the stored characters; submitting the password to the card for authorization; receiving an authentication from the card; and sending the authentication to the mobile device. Generating the password from the stored characters; encrypting the password using a cryptographic key; sending the encrypted password to the mobile device. The indication of the input is a graphical symbol. The mobile device displays a number of empty spots equal to a preset length of the password, and where the mobile device displays the graphical symbol at an empty spot upon sending each selection signal. The selection input or the modification input comprises a user tap of one or more buttons displayed on the mobile device. The character is an integer, wherein the modification input increments or decrements the character based on the user input at a first sensor or a second sensor included in the mobile device, respectively, and wherein modifying the displayed character based on the modification input comprises: incrementing or decrementing the character based on the user tap of the first or the second sensor, respectively.

In another aspect, a method for processing payment transactions between a card, a card reader and a mobile device separate from the card reader, comprising: displaying a plurality of empty spots, where the number of empty spots is equal to a preset length of a password; receiving, at the mobile device, a signal from the card reader, where the signal indicates receiving user input at the card reader; in response to the signal, displaying, on a graphical display of the mobile device, an indication of user input at an empty spot in the plurality of empty spots; receiving password data from the card reader; and transmitting the password data to a payment processing system.

Implementations can include one or more of the following. The password data is an encrypted password, where the encrypted password was encrypted at the card reader. The password data is a password authentication message generated by the card.

In another aspect, a method for processing payment transactions between a card, a card reader and a mobile device separate from the card reader, comprising: displaying a user interface at a display of the mobile device that is configured to receive modification input or selection input, where the modification input causes the card reader to modify a displayed character at the card reader, and where the selection input causes the card reader to store the displayed character; receiving user input at the user interface of the mobile device; sending data representing the user input to the card reader; if the user input is a selection input, displaying, on the user interface, an indication of the user input; receiving password data from the card reader; and transmitting the password data to a payment processing system.

In another aspect, a method for processing payment transactions between a card, a card reader and a mobile device separate from the card reader, comprising: receiving, at the card reader, a request for a password from the card; determining a value for each character of the password through user input at the card reader comprising: receiving user input at one or more sensors of the card reader, wherein the card reader selects a character based on the user input; sending a selection signal to the mobile device that is separate from the card reader, where the selection signal causes the mobile device to display an indication of the user input on a display of the mobile device; storing the selected character; and repeating the determining until the password is submitted.

Implementations can include one or more of the following. The one or more sensors comprise a ten digit numeric keypad.

Implementations can include one or more of the following. The password data is an encrypted password, where the encrypted password was encrypted at the card reader. The password data is a password authentication message generated by the card. Displaying the user interface comprises displaying a number of empty spots equal to a preset length of the password, and where displaying the indication of the user input comprises displaying the indication at an empty spot upon sending each user input.

Advantages may include one or more of the following. The card reader can prevent theft of sensitive information, e.g., PIN information, during PIN entry by displaying the PIN at the card reader and not communicating PIN values with the mobile device.

BRIEF DESCRIPTION OF THE DRAWINGS

Like reference numbers and designations in the various drawings indicate like elements.

DETAILED DESCRIPTION

Figure 1:
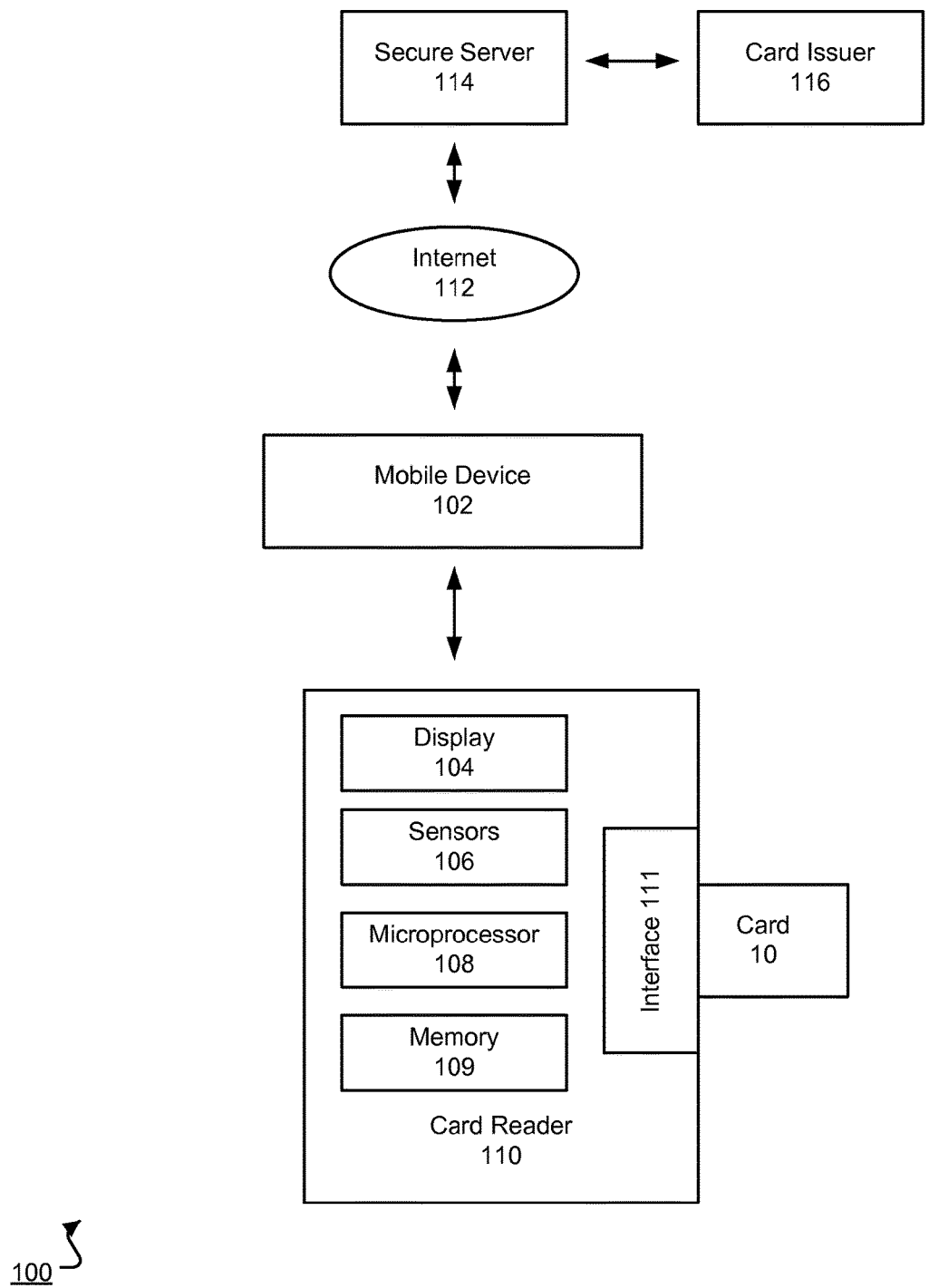
FIG. 1 is a schematic illustration of an example system for conducting a transaction using PIN entry.

FIG. 1 is a schematic illustration of an example system 100 for secure data entry. In some examples, the system 100 is used for conducting a transaction using password entry, e.g., PIN entry. In some implementations, the system 100 is capable of processing a transaction (e.g., payment transaction) from a mobile computing device 102 and a card reader 110. For example, the system 100 can process the card according to the Europay, Mastercard, Visa (EMV) protocol. The mobile computing device 102 can be a smart phone, tablet computer or laptop. The card reader 110 can be detachably connected to the mobile computing device 102 (e.g., via a data connection medium, such as, for example, audio jack connection, usb connection, dock connection, etc.). The card reader 110 is a device that reads data from a card-shaped storage medium. The card reader 110 has an interface 111 for inserting or swiping a card 10.

As a general overview, a card 10 can be inserted into the interface 111 of the card reader 110 so that the reader engages electrical contacts for the microchip on the card 10. In some implementations, the card reader 110 is attached to an audio jack or headset jack of the mobile device 102. In alternative implementations, the card reader 110 communicates with the mobile device 102 wirelessly, e.g., using Bluetooth technology, NFC, or a WiFi hotspot. The card reader 110 can read data from the chip on the card 10. The card reader 110 provides the data from the chip to the mobile device, which sends the data to the card issuer for authentication. The card reader 110 can also include a cryptographic key, e.g., embedded during manufacturing, to encrypt and decrypt data, e.g., the PIN, sent to and received from, respectively, the mobile device 102. The mobile device 102 can transmit an authorization for transaction to a secure server 114 for payment processing using an external network, e.g., the Internet 112. The secure server 114 can relay the transaction to the card issuer 116, which ultimately approves or denies the transaction. The card issuer 116 can communicate the approval or denial to the secure server 114, which can relay the card issuer's response to the mobile device 102. More transaction details will be discussed below in reference to FIG. 2.

The card reader 110 includes a display 104 and a microcontroller 108, e.g., a microprocessor. The microcontroller 108 can read data from memory 109 or other data source, e.g., from the mobile device 102, and present the data on the display 104. In some implementations, the memory 109 stores each value of the PIN. The display 104 can be an electrophoretic ink display, a light emitting diode display, or a liquid crystal display. The display 104 can be a matrix of pixels or can be a segmented display, e.g., a seven segment display. In some implementations, the display 104 presents a single digit.

The card reader 110 can include one or more sensors 106. The microcontroller 108 can also process user input from the one or more sensors 106 to update the display 104, which will be described further below in reference to FIGS. 3 and 4. The one or more sensors can be capacitive sensors that respond to a touch from a user. Other types of sensors are possible, e.g., mechanical pressure sensors. The one or more sensors 106 can be configured as individual buttons, a toggle switch, a scroll wheel sensor, or other types of user input devices.

A PIN for an EMV card can be a four digit numeric code. Other PIN lengths are possible, e.g., more than four digits. The PIN can be a string of alphanumeric characters of a preset length. In some implementations, e.g., with a passcode or PIN, all of the characters are numerical digits.

Figure 2:
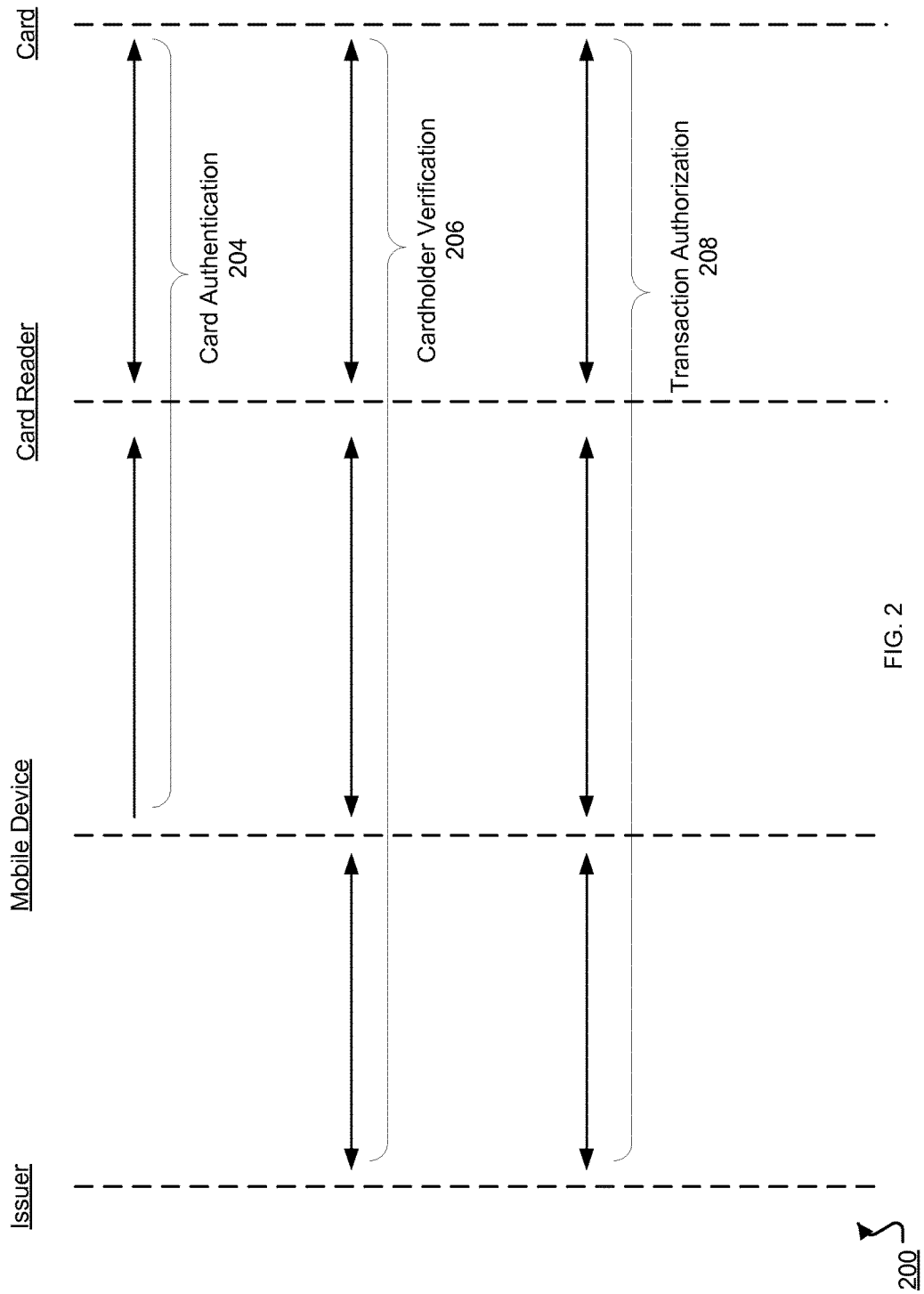
FIG. 2 is a diagram of an example method for conducting a transaction using PIN entry from a mobile device to a card reader.

FIG. 2 is a diagram of an example method (step 200) for conducting a transaction using PIN entry from a mobile device to a card reader. Conducting a transaction using PIN entry involves three phases: 1) card authentication (step 204), 2) cardholder verification (step 206), and 3) transaction authorization (step 208). These three phases involve communication between a card, a card reader, a mobile device, and an issuing bank. The card chip can communicate with the card reader over electrical contacts in the card reader. The card reader can communicate with the mobile device over an audio jack of the mobile device or over a wireless connection. The mobile device can directly communicate with the issuing bank using an Internet, e.g., WiFi, or 3G/4G data connection. In some implementations, the mobile device communicates with a secure server, which in turn communicates with the issuer. The mobile device can use the secure server to store information related to the transaction, e.g., a transaction receipt.

Generally, the card authentication phase (step 204) commences when a card is inserted into the card reader. The card reader requests a list of supported applications (in this context the "applications" refer to types of financial transactions, e.g., credit, debit, or ATM) from the card chip. For example, this list of supported applications can be stored in the file 1PAY.SYS.DDF01, which is selected by the card reader. The card chip sends the list, e.g., the file contents, to the card reader. The card reader receives input selecting a type of application, and sends a message to the card chip selecting the application and starting the transaction. In some implementations, the card reader selects the supported application from the list. The message starting the transaction can serve as a "read record" command to read cardholder records from the card chip. These records can include card details, e.g., primary account number, start and expiry date, backwards compatibility data, e.g., a copy of a magnetic strip, and control parameters, e.g., a type of authentication method to be used, for example, signature, PIN, or none. In some implementations, the records include a digital signature, which can be later verified by an issuing bank.

In the cardholder verification phase (step 206), the card can prompt the card reader for a PIN. The PIN entry will be described below in reference to FIGS. 3-6. The inputted PIN can be provided to the card issuer, e.g., online authentication. The card issuer determines if the inputted PIN matches a PIN associated with the card and indicates whether the PIN entry is a failure or success. In alternative implementations, the card determines whether the inputted PIN matches a PIN embedded in the card, e.g., offline authentication. In offline authentication, if the PIN matches the PIN embedded in the card, the card can send a PIN authentication message to the card reader. The card can maintain a retry counter to limit the number of failed PIN entries. That is, the card can reject a PIN for processing if there are too many failed PIN entries.

In the transaction authorization phase (step 208), the card reader requests the card to generate an authorization request cryptogram (ARQC). The request can include or be followed by the transaction details, which are provided by the mobile device. The transaction details can include transaction amount, currency type, date, terminal verification results (TVR), and/or a nonce generated by the card reader. In response, the card chip generates the ARQC, which includes a cryptographic message authentication code (MAC). The MAC can be generated based on the transaction details. The ARQC can also include an application transaction counter (ATC), which is a sequence counter identifying the transaction, issuer application data (IAD), which is a variable length field containing data generated by the card. In some implementations, the MAC is generated using a symmetric key shared between the card and the issuing bank.

If the card permits the transaction, the card sends the ARQC to the card reader, which sends the ARQC to the mobile device. The mobile device then sends the ARQC to the issuing bank. The issuing bank can perform various cryptographic, anti-fraud, and financial checks on the ARQC. If the checks are satisfied, the issuing bank sends an authorization response code (ARC) that indicates a transaction approval or denial and an authorization response cryptogram (ARPC). In some implementations, the ARPC is a MAC resulting from an XOR operation between the ARQC and the ARC. The card reader sends both the ARPC and the ARC to the card.

The card validates the MAC contained within the ARPC. If the validation is successful, the card can update its internal state to note that the issuing bank has authorized the transaction. The card can send a transaction certificate cryptogram (TC) to the card reader. The TC indicates that the card is authorizing the transaction to proceed. After receiving the TC, the card reader sends the TC to the mobile device, which sends the TC to the issuer. The card reader, the mobile phone, or, if applicable, the secure server can store a copy of the TC in case of a dispute.

Figure 3A:
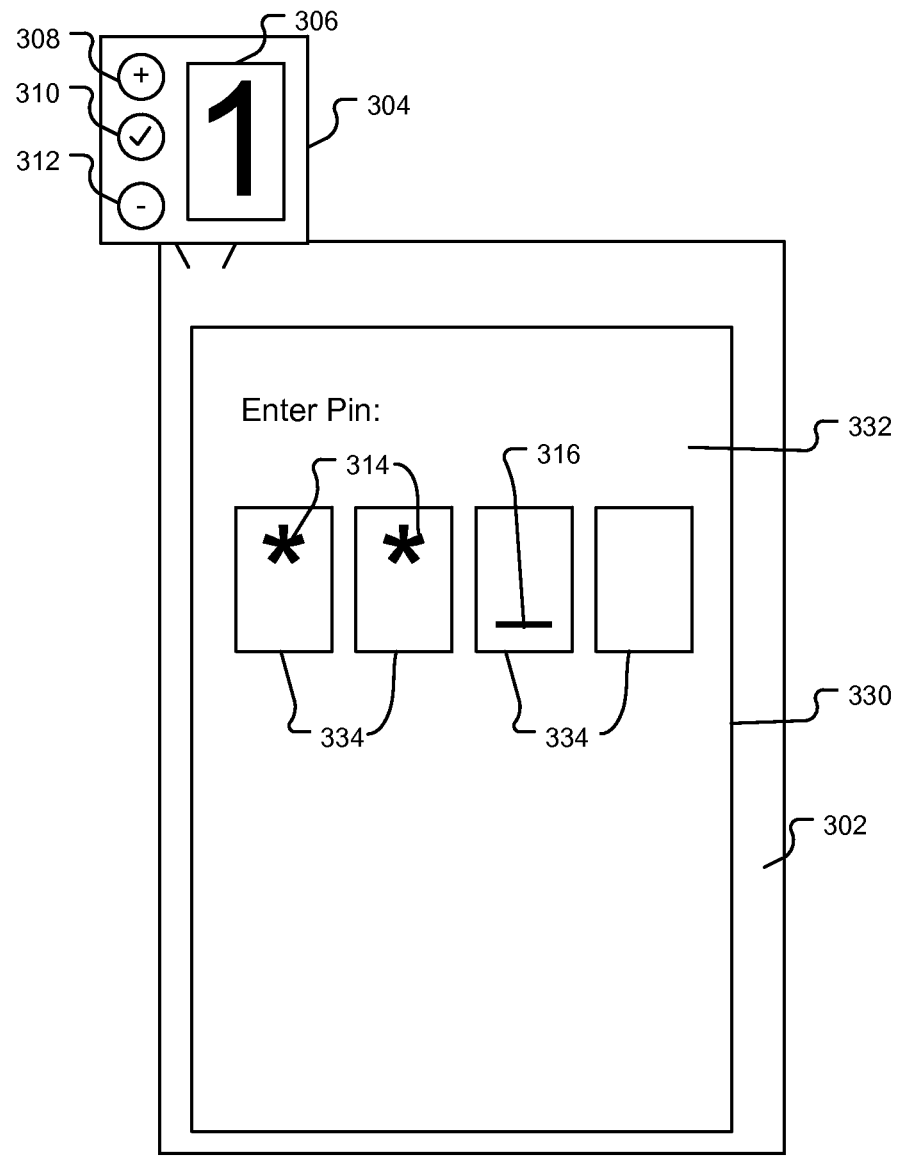
FIG. 3A is a schematic illustration of a mobile device connected to an example card reader having a display with one or more sensors.

FIG. 3A is a schematic illustration 300 of a mobile device connected to an example card reader 304 having a display 306 and one or more sensors. The one or more sensors can include a first sensor 308, a second sensor 312, and a third sensor 310 for PIN entry. The first sensor 308 can be labeled with a '+', the second sensor 312 can be labeled with a '−', and the third sensor 310 can be labeled with a check mark.

A user engaging with, e.g., through a user touch, the first sensor 308 can increment a character displayed by the card reader 304. For example, if the character is a digit, incrementing the character will increase the character's value by 1. If the character is a letter, incrementing the letter can advance the letter through a preset list of characters. Similarly, engaging the second sensor 312 can decrement the character. The microcontroller can receive signals of the engaging from the sensors 308, 312 and increment or decrement the displayed character, respectively. For example, upon receiving a signal from the first sensor 308, the microcontroller retrieves the displayed character, e.g., from memory. The microcontroller can increment the displayed character using an adder and saves output of the adder, e.g., the incremented character, to the memory. The microcontroller can display the incremented character.

Engaging the third sensor 310 can cause the card reader to select the displayed character as a PIN value. The microcontroller can detect engaging of the third sensor 310 and send a selection signal to the mobile device, which will be described further below in reference to FIG. 4. After a user engages the third sensor, the card reader can be configured to receive user input for a next digit of the PIN. Or, if a preset number of digits have been selected, the card reader can be configured to submit the PIN for authorization, which will be described further below in reference to FIG. 4.

The card reader 304 can be coupled to a mobile device 302, e.g., through an audio jack. The mobile device 302 has a touch-screen display 330 that displays a user interface 332. The user interface 332 can indicate the progress of the user through the PIN. Upon receiving a selection signal, the mobile device 302 can display one or more symbols 314, e.g., '*', to each represent a selected character.

In some implementations, the user interface 332 can include a number of shapes 334, e.g., rectangles. The number of shapes 334 can be equal to the number of digits in the PIN. Initially, the shapes can be empty. As each selection signal is received, a symbol 314 can be displayed inside the shape 334 corresponding to the digit of the PIN for which the character was selected. Alternatively, the shape 334 can be replaced by the symbol 314.

The mobile device 302 can also display another symbol 316, e.g., '_', to indicate a position for the next character to be entered during PIN entry. Once all of the digits are entered, the mobile device 302 can display an interface showing a user that the PIN is being submitted. The mobile device 302 can also transmit the PIN in encrypted form, e.g., online authentication, or a PIN authentication message, e.g., offline authentication, as described above in reference to FIG. 2.

In some implementations, the PIN is updated to be more than four digits long. For example, the mobile device can receive, from a payment service system, an instruction to increase a number of digits for the PIN. The mobile device can display a symbol for each selected digit of the PIN.

Figure 3B:
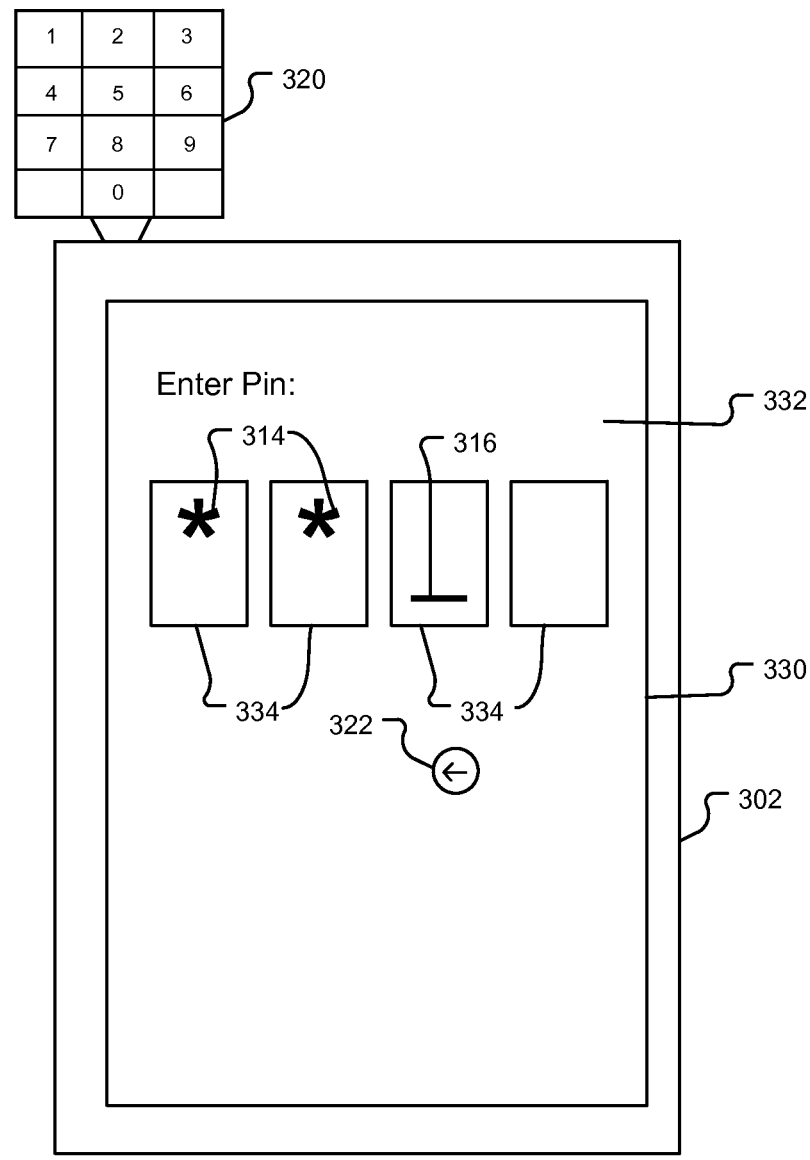
FIG. 3B is a schematic illustration of a mobile device connected to an example card reader having one or more sensors without a display.

FIG. 3B is a schematic illustration 318 of a mobile device connected to an example card reader 320 having one or more sensors without a display. In some implementations, instead of having the first, second, and third sensors 308, 312, and 310 labeled as '+', '−', and a check mark, respectively, as described in reference to FIG. 3B, the card reader can include input sensors, e.g., in the form of a 10-key numeric keypad, without a display. Each button can be associated with a character, e.g., the button labeled '1' represents a '1' character. The microcontroller can detect engaging of each sensor on the card reader. Upon the engaging, the card reader can store the character associated with the sensor in memory and send a selection signal to the mobile device. Upon receiving the selection signal, the mobile device can display a symbol as described above in reference to FIG. 3A. Selection signals are described further below in reference to FIG. 4.

In some implementations, the mobile device can erase a character of the PIN that is stored at the card reader. For example, a user can interface with the backwards arrow 322. Upon user selection of the backwards arrow 322, the mobile device can send a deletion signal to the card reader, which processes the deletion signal by erasing, in the memory of the card reader, a most recently inputted character of the PIN.

Figure 4:
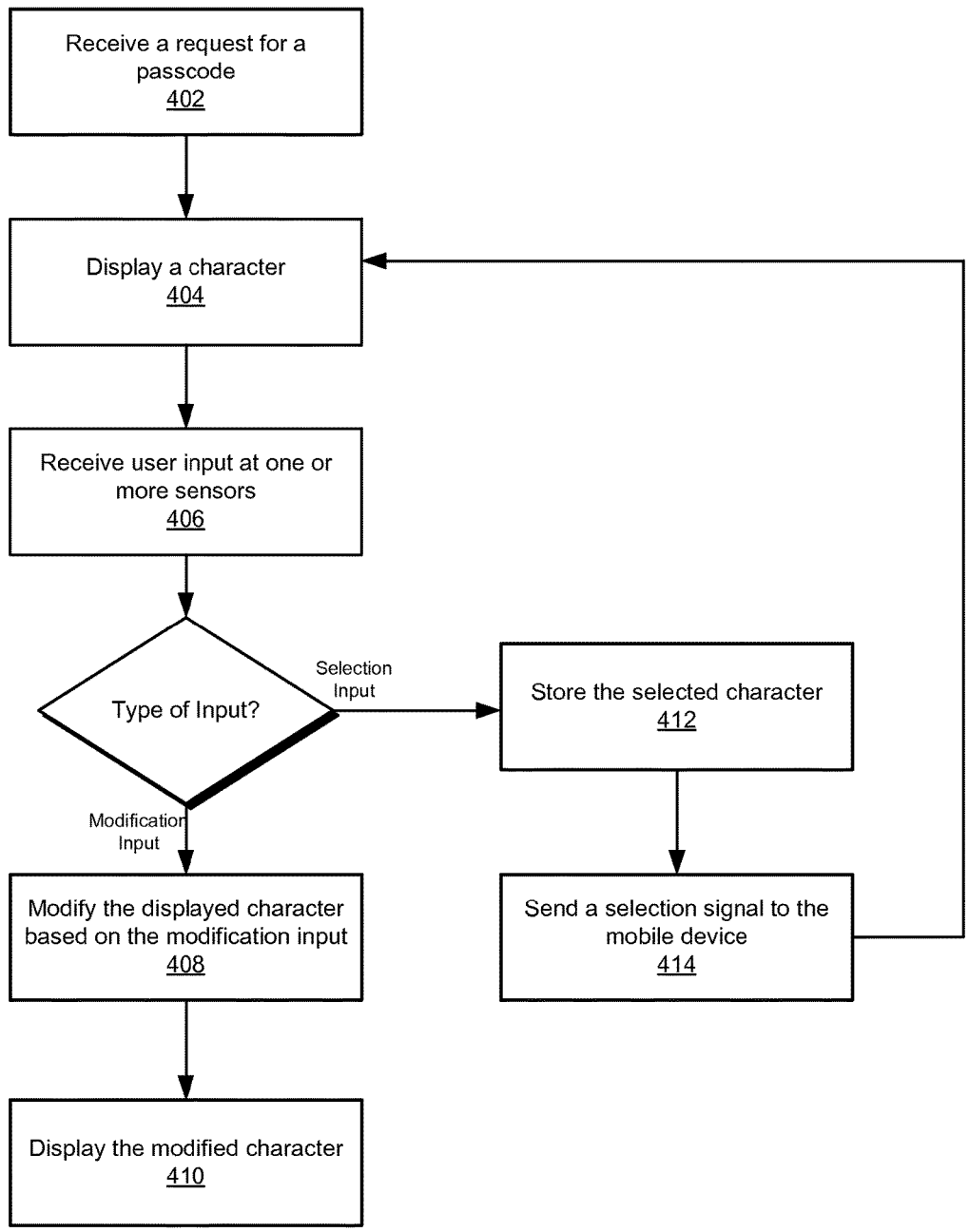
FIG. 4 is an example flow chart of a method for conducting a transaction using a card reader having a display that includes one or more sensors.

FIG. 4 is an example flow chart 400 of a method for conducting a transaction using a card reader having a display that includes one or more sensors.

The card reader receives a request for a PIN from a card (step 402). This can occur during the cardholder verification phase described above in reference to FIG. 2.

The card reader determines a value for each character in the PIN through user input at one or more sensors included at the card reader. The card reader displays a character on the card reader's display (step 404). In some implementations, the character is a digit. The card reader can receive the user input from the one or more sensors (step 406). The user input can be a modification input, e.g., a user selects a first or a second sensor to increment or decrement, respectively, as described above in reference to FIG. 3, or a selection input, e.g., a user selects a check sensor.

If the user input is a modification input, the card reader modifies the displayed character according to the input (step 408) and displays the modified character (step 410). For example, the card reader can default to display a '0' by default for every new character to be entered during PIN entry. If a user interacts (e.g., taps) the second sensor once to decrement the character, the card reader will display a '9.' Then, if the user taps the first sensor to increment the character three times, the card reader will display a '2.' Repeated interaction with the sensors by the user will cause the card reader to increment or decrement the displayed character, until the displayed character is eventually selected.

If the user input is a selection input, the card reader can store the selected character that is displayed, e.g., in memory (step 412). The card reader can send a selection signal to the mobile device (step 414). The selection signal does not contain any sensitive PIN data, i.e., does not include the value itself, but indicates that a PIN value was selected. When the mobile device receives the selection signal, the mobile device can display an indication of the user input on a display of the mobile device. For example, the mobile device can display a placeholder character, e.g., a '*' symbol, after receiving a selection signal, which indicates to a user that a character was selected as a PIN value.

The card reader can repeat steps 404-414 until the entire PIN is submitted. To submit the PIN, the card reader can first generate the PIN from the selected PIN values, e.g., stored in memory. The PIN can be submitted to the card, e.g., offline authentication, or encrypted and sent to the mobile device, e.g., online authentication. In some implementations, the card reader submits the PIN when four characters are selected. Other PIN lengths are possible, e.g., more than four characters. In some other implementations, the card reader receives a PIN submission request from the mobile device, e.g., a user taps an enter button on a display of the mobile device, and submit the PIN.

Figure 5:
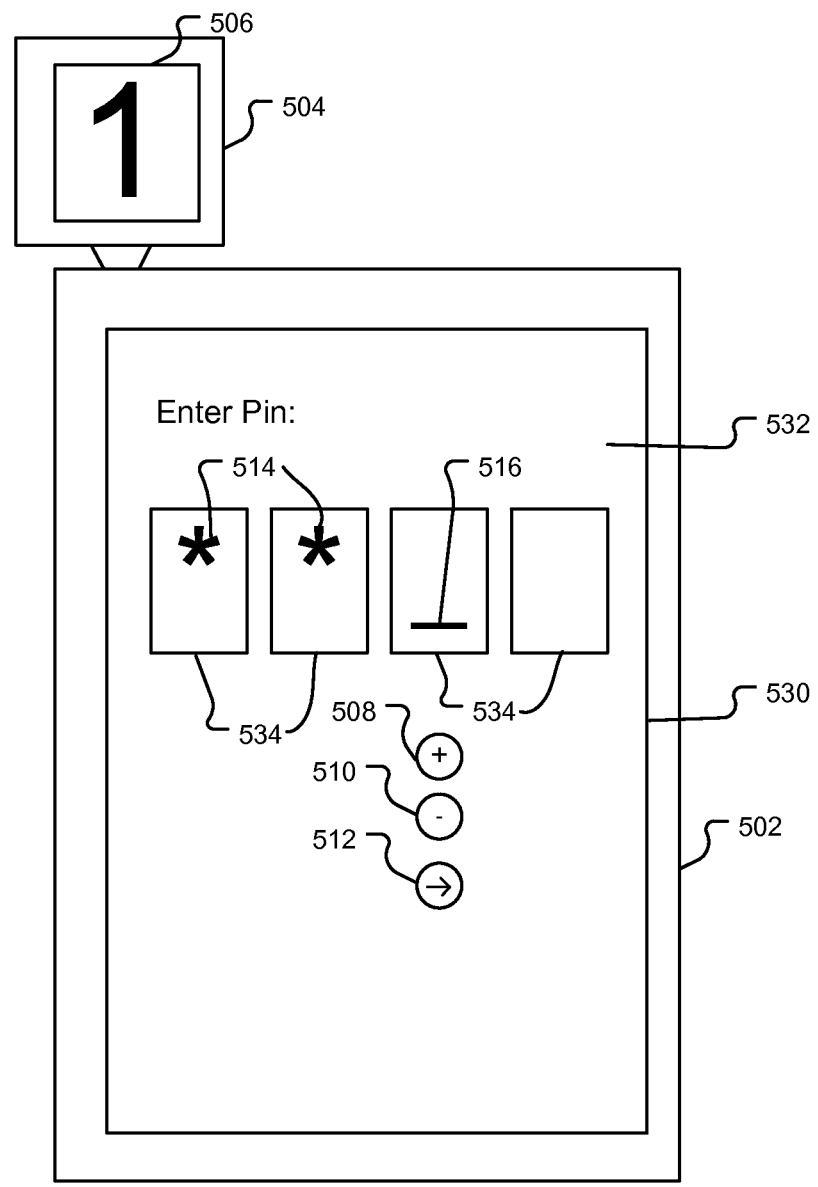
FIG. 5 is a schematic illustration of a mobile device connected to an example card reader having a display.

FIG. 5 is a schematic illustration 500 of a mobile device 502 having user input for PIN entry and being connected to an example card reader with a display 506. Here, the card reader 504 does not provide a user interface for direct PIN entry as described above in reference to FIG. 3. That is, the card reader does not include one or more sensors for PIN entry. However, the mobile device 502 can provide equivalent functionality to increment or decrement each digit in the PIN. The mobile device 502 has a touch-screen display 530 that displays a user interface 532. The user interface 532 can indicate the progress of the user through the PIN. For example, the mobile device can generate a user interface 532 that includes a first button 508, a second button 510, and a third button 512. The buttons respectively increment, decrement, and select a displayed character on the card reader 502 as described above in reference to FIG. 3. User interaction with the buttons will be described further below in reference to FIG. 6. In some implementations, instead of displaying buttons, the mobile device displays a slider. A user can swipe the slider, which will cause the mobile device to send a signal incrementing or decrementing the displayed character based on a direction of the swipe.

Engaging the check button 512 can cause the card reader to select the displayed character as a PIN value. The mobile device can send a selection signal to the card reader, and a microcontroller in the card reader can process the selection signal, which will be described further below in reference to FIG. 6.

Upon sending the selection signal, e.g., from engaging the check button 512, the mobile device 502 can display one or more symbols 514, e.g., '*', to each represent a selected character. The mobile device 502 can also display another symbol 516, e.g., '_', to indicate a position for the next character to be entered during PIN entry. Interaction between the mobile device 502 and the card reader 504 will be described further below in reference to FIG. 6. The interface 532 can include shapes 534 in which the symbols 514 are displayed, as described above in reference to FIG. 3A.

Figure 6:
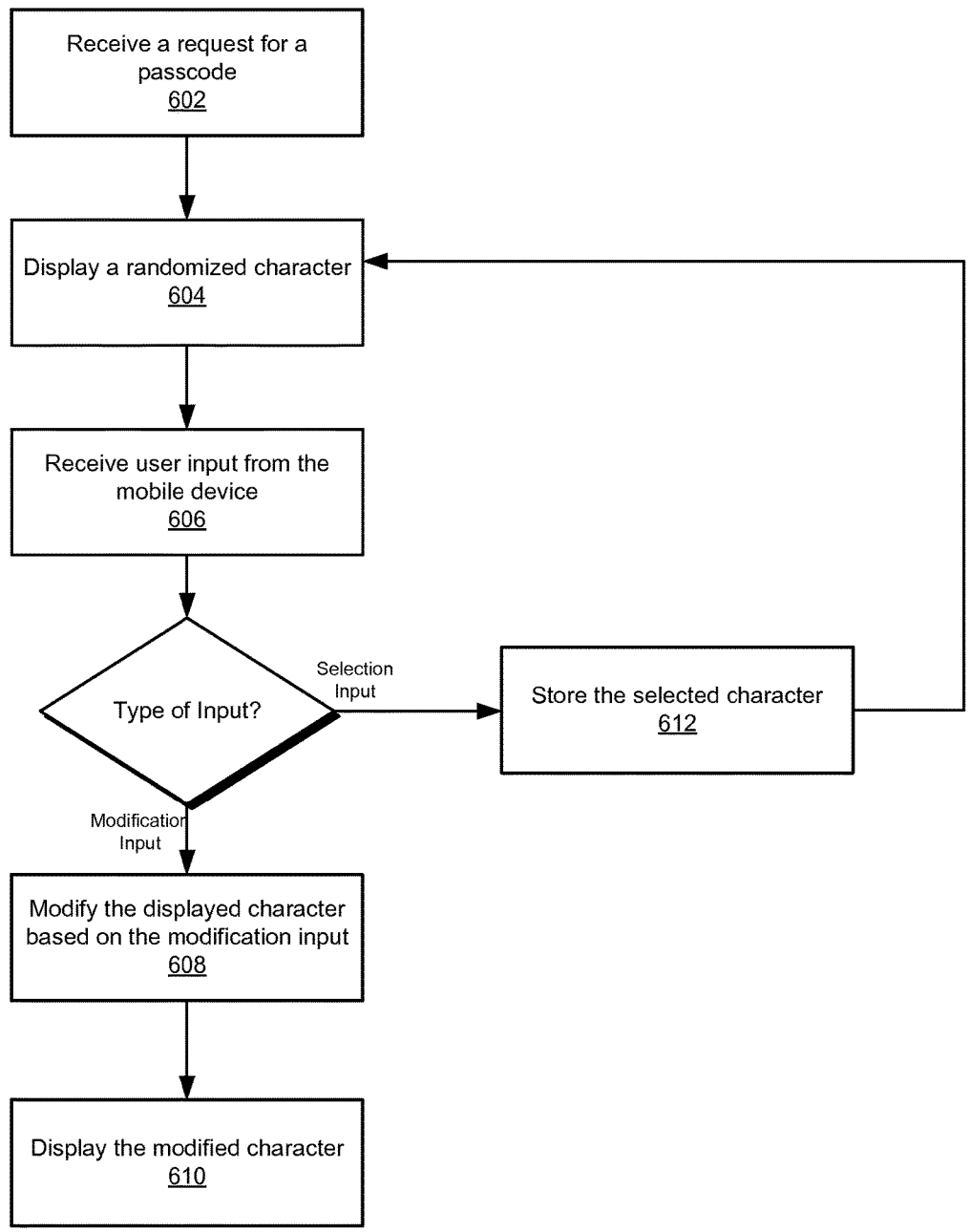
FIG. 6 is an example flow chart 600 of a method for conducting a transaction using a mobile device processing user input for PIN entry and a card reader with a display.

FIG. 6 is an example flow chart 600 of a method for conducting a transaction using a mobile device processing user input for PIN entry and a card reader with a display.

The card reader receives a request for a PIN from a card (step 602). This can occur during the cardholder verification phase described above in reference to FIG. 2.

The card reader determines a value of each character in the PIN through user input at the mobile device. In some examples, the card reader displays a specific starting value. In other examples, the card reader randomly selects a starting character and displays the starting character on the display for each new character to be entered during PIN entry (step 604). Randomizing each newly displayed character prevents malware from extrapolating a PIN value. For example, if the character were to start with a specific value, malware on a mobile device could count a number of times that the modification buttons are selected and determine a PIN value from the count. However, because the starting character is randomized, the malware will be unable to extrapolate the PIN value with only the sequence of modification input and selection input at the mobile device.

The mobile device sends, to the card reader, a data representing user input for each selected button. For example, the mobile device can send a plus signal for a tapped first button to indicate a character in the PIN should be incremented, a minus signal for a tapped second button to indicate the character should be decremented, or a selection signal for a tapped third button to indicate the character should be selected. The card reader can receive the data representing the user input from the mobile device (step 606). Similar to the method described above in reference to FIG. 4, the user input can be classified as modification input, e.g., a user selects a first or a second button, or selection input, e.g., a user selects a third button.

If the user input is modification input, the card reader modifies the displayed character according to the input (step 608) and displays the modified character (step 610). For example, the card reader can randomly select a '3' for as the starting character for a particular digit in the PIN. If a user taps the second button once to decrement the character, the mobile device sends, to the card reader, modification input to subtract the displayed character. The card reader can process the modification input by accessing the displayed character from memory, decrementing the character, and displaying the decremented character, e.g., a '2.' Then, if a user taps the first button to increment the character three times, the mobile device can send, for each tap, modification input that causes the mobile device to add to the displayed character. The card reader will display a '5.' The card reader can increment or decrement the displayed character until the displayed character is selected.

If the user input is selection input, the card reader can store the selected character as a character in the PIN, e.g., in memory (step 612). When the mobile device sends the data representing selection input, the mobile device can display an indication of the user input on a display of the mobile device. For example, the mobile device can display a '*' symbol, which indicates to a user that a character was selected as a PIN value.

The card reader can repeat this until the PIN is submitted. To submit the PIN, the card reader can first generate the PIN from the selected PIN values, e.g., stored in memory. The PIN can be submitted to the card, e.g., offline authentication, or encrypted and sent to the mobile device, e.g., online authentication. In some implementations, the card reader submits the PIN when four characters are selected. In some other implementations, the card reader receives a PIN submission request from the mobile device, e.g., a user taps an enter button on a display of the mobile device, and submit the PIN.

In some implementations, the card reader includes light emitting diodes (LEDs). The card reader can include an LED for each PIN value. An LED can be turned on for each selected digit of the PIN. For example, if three digits of the PIN are entered, the card reader can turn on three LEDs. This can provide feedback to the user as to the number of digits received by the card reader during PIN entry.

Figure 7:
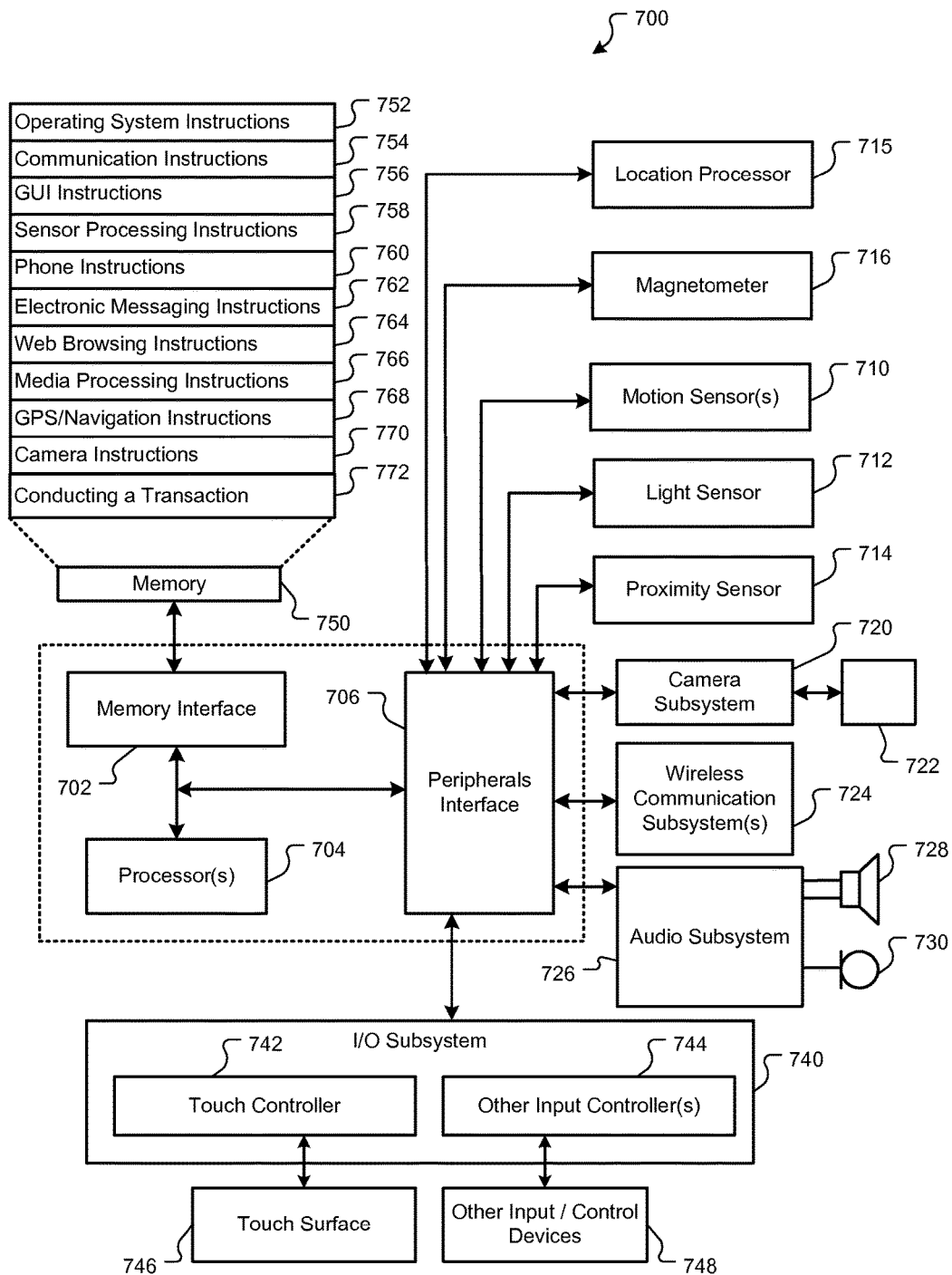
FIG. 7 is a block diagram of an exemplary architecture of a mobile device capable of conducting a transaction with PIN entry.

FIG. 7 is a block diagram of an exemplary architecture of a mobile device capable of conducting a transaction with PIN entry. Architecture 700 can be implemented in any device for generating the features described in reference to FIGS. 1-6, including but not limited to portable or desktop computers, smart phones and electronic tablets, television systems, game consoles, kiosks and the like. Architecture 700 can include memory interface 702, data processor(s), image processor(s) or central processing unit(s) 704, and peripherals interface 706. Memory interface 702, processor(s) 704 or peripherals interface 706 can be separate components or can be integrated in one or more integrated circuits. The various components can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the device. For example, in some implementations, light sensor 712 can be utilized to facilitate adjusting the brightness of touch surface 746. In some implementations, motion sensor 710 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 706, such as a temperature sensor, a biometric sensor, or other sensing device, to facilitate related functionalities.

Location processor 715 (e.g., GPS receiver) can be connected to peripherals interface 706 to provide geo-positioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 724. Communication subsystem(s) 724 can include one or more wireless communication subsystems. Wireless communication subsystems 724 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 724 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 724 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 726 can be coupled to a speaker 728 and one or more microphones 730 to facilitate voice-enabled functions, such as voice recognition, voice replication, digital recording, and telephony functions.

I/O subsystem 740 can include touch controller 742 and/or other input controller(s) 744. Touch controller 742 can be coupled to a touch surface 746. Touch surface 746 and touch controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 can display virtual or soft buttons and a virtual keyboard, which can be used as an input/output device by the user.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In some implementations, device 700 can present recorded audio and/or video files, such as MP3, AAC, and MPEG files. In some implementations, device 700 can include the functionality of an MP3 player and may include a pin connector for tethering to other devices. Other input/output and control devices can be used.

Memory interface 702 can be coupled to memory 750. Memory 750 can include high-speed random access memory or non-volatile memory, such as one or more magnetic disk storage devices, one or more optical storage devices, or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers or servers. Communication instructions 754 can also be used to select an operational mode or communication medium for use by the device, based on a geographic location (obtained by the GPS/Navigation instructions 768) of the device. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions and display GUIs; media processing instructions 766 to facilitate media processing-related processes and functions; GPS/Navigation instructions 768 to facilitate GPS and navigation-related processes; camera instructions 770 to facilitate camera-related processes and functions; and instructions 772 for conducting a transaction with PIN entry. The memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims.

Although the description above focuses on secure password entry in a financial transaction, other applications are possible. For example, the method for secure password entry can be used to log a user into any private service.

What is claimed is:

1. A method for processing payment transactions between a card, a card reader and a mobile device separate from the card reader, the method comprising:
   receiving, at the card reader, a request for a password from the card;
   determining, by the card reader, a value for each character of the password through user input at the mobile device by
      displaying, on a graphical display included in the card reader, a character selected by the card reader;
      receiving data representing user input from the mobile device, wherein the user input selects or modifies the character;
      determining whether the user input is a modification input or a selection input;
      in the event that the user input is a modification input:
         modifying the character based on the modification input to produce a modified character; and
         displaying, on the graphical display, the modified character;
      in the event that the user input is a selection input:
         receiving a selection signal from the mobile device that is separate from the card reader, wherein the mobile device is configured to display an indication of the user input upon receiving the selection input; and
         storing a selected character specified by the selection input; and
   repeating the determining of the value of each character of the password until the password is completed.

2. The method of claim 1, where the selected character is stored in the card reader.

3. The method of claim 1, further comprising:
generating the password from one or more selected characters stored by the card reader;
submitting the password to the card for authorization;
receiving an authentication from the card; and
sending the authentication to the mobile device.

4. The method of claim 1, further comprising:
generating the password from one or more selected characters stored by the card reader;
encrypting the password using a cryptographic key; and
sending the encrypted password to the mobile device.

5. The method of claim 1, wherein the indication of the user input is a graphical symbol.

6. The method of claim 5, where the mobile device displays a number of empty spots equal to a preset length of the password, and where the mobile device displays the graphical symbol at an empty spot upon sending each selection signal to the card reader.

7. The method of claim 1, wherein the selection input or the modification input comprises a user tap of one or more buttons displayed on an interface presented by the mobile device.

8. The method of claim 1, wherein the character is an integer, wherein the modification input increments or decrements the character based on the user input at a first sensor or a second sensor included in the mobile device, respectively, and wherein said modifying the character based on the modification input comprises:
incrementing or decrementing the character to produce the modified character based on the user tap of the first sensor or the second sensor, respectively.

9. A method for processing payment transactions between a card, a card reader and a mobile device separate from the card reader, the method comprising:
displaying, by the mobile device, a user interface that is configured to receive user input that selects or modifies a character displayed by the card reader, where the user input is a modification input that causes the card reader to modify the character or a selection input that causes the card reader to store the character;
receiving, by the mobile device, user input at the user interface;
sending, by the mobile device, data representing the user input to the card reader;
in the event that the user input is a selection input, displaying, by the mobile device, an indication of the user input on the user interface;
receiving, by the mobile device, transaction data from the card reader; and
transmitting, by the mobile device, the transaction data to a payment processing system.

10. The method of claim 9, where the transaction data includes an encrypted password, and where the encrypted password was encrypted at the card reader.

11. The method of claim 9, where the transaction data includes a password authentication message generated by the card.

12. The method of claim 9, where displaying the user interface comprises displaying a number of empty spots equal to a preset length of the password, and where displaying the indication of the user input comprises displaying the indication at an empty spot upon sending data representing the selection input to the card reader.

13. The method of claim 1, wherein the card reader is attached to an audio jack of the mobile device.

14. The method of claim 1, wherein the card reader is configured to wirelessly communicate with the mobile device across a network.

15. The method of claim 9, further comprising:
if the user input is a selection input, transmitting, by the mobile device, a signal to the card reader that prompts the card reader to modify the character displayed by the card reader.

16. A card reader comprising:
a display configured to display a character;
a microcontroller configured to process data indicative of user input received at a mobile device with which the card reader communicates; and
a memory that includes instructions, which, when executed by the microcontroller, cause the card reader to perform operations including:
receive a request for a password from a card swiped at the card reader;
determine a value for each character of the password through user input at the mobile device by
displaying, on the display, a character selected by the card reader;
receiving the data representing the user input from the mobile device;
determining whether the user input is a modification input or a selection input;
in the event that the user input is a modification input:
modifying the character based on the modification input to produce a modified character; and
displaying, on the display, the modified character;
in the event that the user input is a selection input:
receiving a selection signal from the mobile device, wherein the mobile device is configured to display an indication of the user input upon receiving the selection input; and
storing a selected character specified by the selection input in the memory; and
repeating the determining of the value of each character of the password until the password is completed.

17. The card reader of claim 16, wherein the character is an integer and wherein the modification input increments or decrements the character.

18. The card reader of claim 16, further comprising circuitry that communicates with the mobile device through an audio jack.

19. The card reader of claim 16, further comprising circuitry that communicates with the mobile device wirelessly.

20. The card reader of claim 16, wherein the display is a segment display or an electrophoretic ink display.

21. The card reader of claim 16, further comprising a plurality of light emitting diodes, where one of the plurality of light emitting diodes is configured to turn on for each selected character.

22. A method for processing payment transactions between a card, a card reader, and a mobile device separate from the card reader, the method comprising:
receiving, at the card reader, a request for a password from the card;
displaying, by the mobile device, a user interface that is configured to receive user input that selects or modifies a character displayed by the card reader, where the user input is a modification input that causes the card reader to modify the character or a selection input that causes the card reader to store the character;

displaying, on a graphical display of the card reader, a character selected by the card reader;
receiving, by the mobile device, user input at the user interface;
transmitting, by the mobile device, data representing the user input to the card reader;
determining, by the card reader, that the user input is a modification input;
responsive to determining that the user input is a modification input:
- modifying, by the card reader, the character based on the modification input to produce a modified character; and
- displaying, on the graphical display of the card reader, the modified character;
- determining, by the card reader, that the user input is a selection input;
- responsive to determining that the user input is a selection input:
- receiving, by the card reader, a selection signal from the mobile device, which displays an indication of the user input upon receiving the selection input; and
- storing, by the card reader, a selected character specified by the selection input;
repeating, by the card reader, the determining of the value of each character of the password until the password is completed;
creating, by the card reader, transaction data;
transmitting, by the card reader, the transaction data to the mobile device; and
transmitting, by the mobile device, the transaction data to a payment processing system.

* * * * *